(12) United States Patent
Redondo Garcia et al.

(10) Patent No.: US 8,504,340 B2
(45) Date of Patent: Aug. 6, 2013

(54) METHODS AND SYSTEMS FOR OPTIMIZING THE DESIGN OF AERODYNAMIC SURFACES

(75) Inventors: Daniel Redondo Garcia, Madrid (ES); Javier De Bona Piedrabuena, Madrid (ES)

(73) Assignee: Airbus Operations, S.L., Madrid (ES)

( * ) Notice: Subject to any disclaimer, the term of this patent is extended or adjusted under 35 U.S.C. 154(b) by 155 days.

(21) Appl. No.: 12/956,831

(22) Filed: Nov. 30, 2010

(65) Prior Publication Data

US 2011/0161057 A1   Jun. 30, 2011

(30) Foreign Application Priority Data

Nov. 30, 2009   (ES) .................................. 200931082

(51) Int. Cl.
*G06G 7/57* (2006.01)
*G06T 11/00* (2006.01)
*G01M 9/08* (2006.01)

(52) U.S. Cl.
USPC .......... 703/9; 703/6; 703/1; 345/420; 702/50; 73/118.03; 73/147

(58) Field of Classification Search
None
See application file for complete search history.

(56) References Cited

U.S. PATENT DOCUMENTS

| 5,801,969 | A  | * | 9/1998 | Nagahama | 703/9 |
| 6,088,521 | A  | * | 7/2000 | Strumolo et al. | 703/8 |
| 6,959,269 | B1 | * | 10/2005 | Welterlen | 703/8 |
| 7,127,380 | B1 | * | 10/2006 | Iverson et al. | 703/2 |
| 7,239,990 | B2 | * | 7/2007 | Struijs | 703/2 |
| 7,430,500 | B2 | * | 9/2008 | Lei et al. | 703/9 |
| 7,921,002 | B2 | * | 4/2011 | Kamatsuchi | 703/9 |
| 2009/0164175 | A1 | * | 6/2009 | Redondo Garcia et al. | 703/1 |
| 2010/0318327 | A1 | * | 12/2010 | Holden et al. | 703/1 |

OTHER PUBLICATIONS

"NASA—What is Aerodynamics?" <http://www.nasa.gov/audience/forstudents/k-4/stories/what-is-aerodynamics-k4.html> (As archived Apr. 13, 2008).*
Nelson, Chris "Evaluating Commercial CFD Codes" <http://www.innovative-cfd.com/cfd-codes.html> (As archived Apr. 12, 2009).*
Nelson, Chris "Choosing a CFD Solver" <http://www.innovative-cfd.com/cfd-solver.html> (As archived Apr. 11, 2009).*
Dictionary.com definition of "geometric."*
Reed et al., "Linear Stability Theory Applied to Boundary Layers," *Annu. Rev. Fluid. Mech.*, 28:389-428, XP-002636377, 1996.

* cited by examiner

*Primary Examiner* — Kamini S Shah
*Assistant Examiner* — Jay B Hann
(74) *Attorney, Agent, or Firm* — Seed IP Law Group PLLC

(57) ABSTRACT

Methods and systems for optimizing the design of aerodynamic surfaces are provided. They include in the design process of an aerodynamic surface of a body which moves through a flow field, the following: preparation of a CFD simulation of said body; resolution of the CFD calculation for specific conditions of the flow field and for obtaining flow lines of the flow on said surface; calculation of at least one geometrical variable of the surface, such as, for example, the normal curvature, according to the direction of said flow lines; and simultaneous visualization of the surface of said body and of at least one geometric variable. Additionally, at least one variable of the aerodynamic flow, such as, for example, a pressure gradient, may be calculated and visualized.

12 Claims, 8 Drawing Sheets

METHODS AND SYSTEMS FOR OPTIMIZING THE DESIGN OF AERODYNAMIC SURFACES

CROSS-REFERENCE TO RELATED APPLICATION

This application claims the benefit under 35 U.S.C. §119 of Spanish Patent Application No. ES 200931082, filed Nov. 30, 2009, which application is incorporated herein by reference in its entirety.

BACKGROUND

1. Technical Field

This invention refers to methods and systems for optimizing the design of the surfaces of bodies moving through a fluid medium, and in particular methods and systems for optimizing the design of aircraft surfaces.

2. Description of the Related Art

Currently aircraft design is carried out using computational fluid dynamics (CFD) and wind tunnel testing (WTT) with the current trend being to reduce tunnel testing and increase simulation. The advantages of CFD simulation are significant, as the time needed to obtain a solution is reduced, and more optimized solutions may be obtained due to the flexibility and automation of the process.

A CFD calculation requires a 3D discrete model of the aircraft and its surrounding space and a CFD solver implemented in a computer. The discrete model of the aircraft is created using one or more computer programs to develop a volumetric grid where the geometry of the aircraft is divided into sub domains for the application of the surrounding conditions of the fluid dynamic problem. The CFD solver enables relevant CFD calculations to be defined for said discrete model.

Computational Fluid Dynamics (CFD) permits detailed calculations to be made of any system in which fluids are involved by means of solving basic equations for the conservation of matter, energy, and amount of movement of the specific geometry of each system considered. The results obtained are the values of all the variables which characterize the flow field (speed, pressure, temperature, composition, etc) in each of the points thereof.

In this respect the simulation methods known in the art and used to optimize design of aerodynamic surfaces follow the stages of the diagram represented in FIG. 1.

In the first stage 11 the initial geometry of the surface in question is defined, generally using CAD based on 2D plans or drawings which contain the basic characteristics of the design.

In the second stage 13 a computational grid is generated. The domain in question thus becomes discrete divided into small cells with different forms. The complexity of the physics involved, together with the size of the domain largely defines the size of the problem and the calculation power needed. The node density may change from some regions to others requiring accumulation of a greater number of these in zones where considerable variations of a variable are expected.

In the third stage 15 equations are solved, governing the variables of interest for the design of the surface of each of the elements of the computational grid generated in the previous stage. Since the equations are in partial derivatives, it is necessary to convert them to algebraic equations (introducing numerical discretization errors and truncation) using the most appropriate numerical schemes. Thus a group of equations in partial derivatives on a continuous space (x, y, z, t) becomes a finite system of algebraic equations with independent discrete variables $(x[i], y[i], z[i], t[j])$.

In the fourth stage 17 the results obtained are analyzed and if the distribution of values of the objective functions is not satisfactory, an iterative cycle is created, the first step 19 of which is to modify the computational grid and subsequently repeat the third and fourth stages 15, 17, in order to make the CFD calculations and analyze their results in relation to the grid modified in the step 19. Having obtained good results, the final stage 21 is undertaken in which the geometric definition of the "optimized" surface is obtained based on the computational grid.

As may be deduced from the foregoing, in this design process there is no link between the geometric analysis and the simulation analysis. The process is based on a geometric definition and ends with a modified geometry, however the modification is not the result of a geometric analysis but a simulation analysis. This leads to greater cost and duration of the design processes.

This invention is designed to overcome this disadvantage.

BRIEF SUMMARY

This invention is designed to provide methods and systems for ensuring that the design processes of aerodynamic surfaces can conjugate CFD simulation and geometric analysis.

Embodiments of the present invention provide methods and systems which will permit the designer of the aerodynamic surfaces to visualize, together with the surface geometry, the relevant aerodynamic characteristics thereof.

Embodiments of the present invention also provide methods and systems which will permit reduction in the costs of aerodynamic surface design.

In one aspect, these and other objectives are achieved by providing a computer assisted method for optimizing the design of a surface of a body which moves within a flow field, where the method comprises preparation of a CFD simulation of said body, that involves at least one CFD calculation;

resolution of the CFD calculation for at least one specified condition of the flow field and obtaining at least one flow line on said surface of the body;

calculation of at least one geometric variable of the surface according to the direction of said at least one flow line; and simultaneous viewing of the surface of said body and of the aforesaid at least one geometric variable.

In one embodiment of the present invention, said geometric variable is the normal curvature. As a result the designer is able to view jointly with the surface of the body the variation of a geometric variable, which is very relevant from an aerodynamic perspective.

In one embodiment, at least one characteristic of the aerodynamic flow is also calculated and viewed, such as the pressure gradient, along the current lines. This provides the designer with relevant complementary information for optimizing the design of the aerodynamic surface.

In one embodiment of the present invention, the graphic representation of said variable is carried out on the actual surface of the body (through for example, the use of color codes). As a result it is possible to facilitate particular zones appropriate for optimization.

In another embodiment of the present invention, the graphic representation of said variables is carried out on the flow lines themselves (through for example, use of the color codes). Thus it is possible to facilitate identification of the modifications to be carried out in order to optimize the surface.

In another aspect, the objects mentioned are obtained by providing a system for optimizing the design of a surface of a body which moves through a flow field which comprises:

a CAD module for viewing said surface as well as the geometric or physical characteristics associated with it;

a CFD module in 3D implemented in a computer in order to obtain the flow lines on said surface for specific conditions of flow field; and a calculation module, which is configured for:
receiving from the CFD Module geometric data of said current lines;

calculating at least one geometric variable of the surface according to the direction of said current lines; and transmitting said calculations of said at least one geometric variable to the CAD module for viewing.

In one embodiment of the present invention, said geometric variable is the curvature. With this the designer is able to view together with the body surface the variation of a very relevant geometric variable from an aerodynamic perspective.

In some embodiments of the present invention, in the calculation module at least one characteristic of the aerodynamic flow is calculated and transmitted, such as the pressure gradient, according to the direction of said current lines. Thus it is possible to provide the designer with relevant complementary information for optimizing the design of the aerodynamic surface.

Other characteristics and advantages of the present invention shall be made evident in the following detailed description of their object in relation to the attached figures.

DETAILED DESCRIPTION

Geometric design consists of defining geometric entities based on a number of requirements and fulfilling certain restrictions. Said entities are commonly curves, surfaces or volumes, in general three dimensional. More specifically, the aerodynamic geometric design, or simply aerodynamic design, usually conceives directional surfaces considering that only one of their faces is in contact with the air. These aerodynamic surfaces are subsequently connected in order to enclose a volume and form a closed surface in space.

The capacity for viewing the geometry is unquestionably useful when carrying out a design. The viewing transforms an abstract or mathematical definition (computational) of the geometry into images and attempts to represent specific characteristics on it. When carrying out classic design, the definition of the geometry is a first step which permits simulation to be commenced; however geometric analysis is not linked to simulation analysis.

The basic idea of this invention consists of combining in the aircraft surface design process—or other bodies which move in fluid media—the representation of geometric characteristics of the surfaces with aerodynamic characteristics of special interest for the design.

A first relevant characteristic is the (normal) curvature according to the direction of the local current line direction of the flow on the surface, in the event of a non viscous fluid, or either according to local friction lines, in the event of viscous fluid. Also the representation of the (normal) curvature is considered according to the projection of the flow lines of the "external" solution (outside the limit layer) on the surface in the case of viscous fluid.

The normal curvature of an aerodynamic surface is one of the variables which has the greatest influence on the development of its limit layer. One skilled in the relevant art may also refer to the limit layer as the boundary layer. Therefore knowledge of its development and continuity supplies valuable information to the designer for analysis of the limit layer in the direction in which it is two way.

Figure 1:
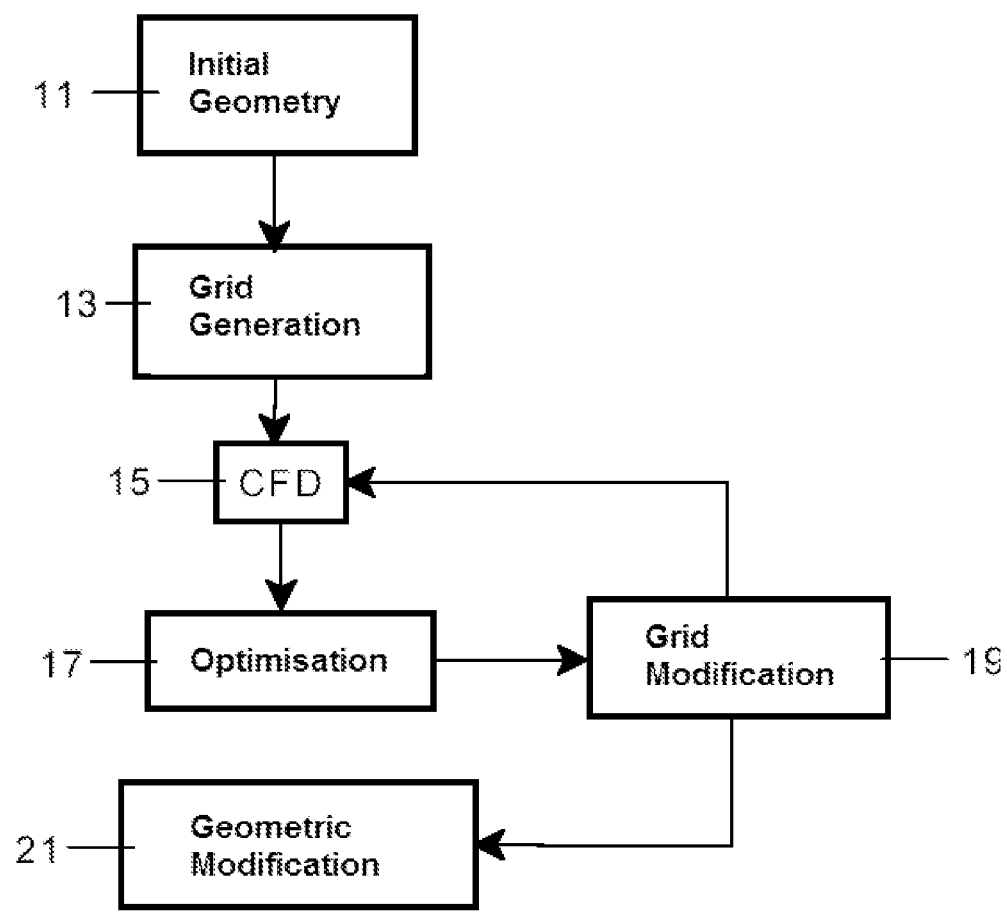
FIG. 1 shows a block diagram illustrating a known design process of an aerodynamic surface using CFD.
Figure 2:
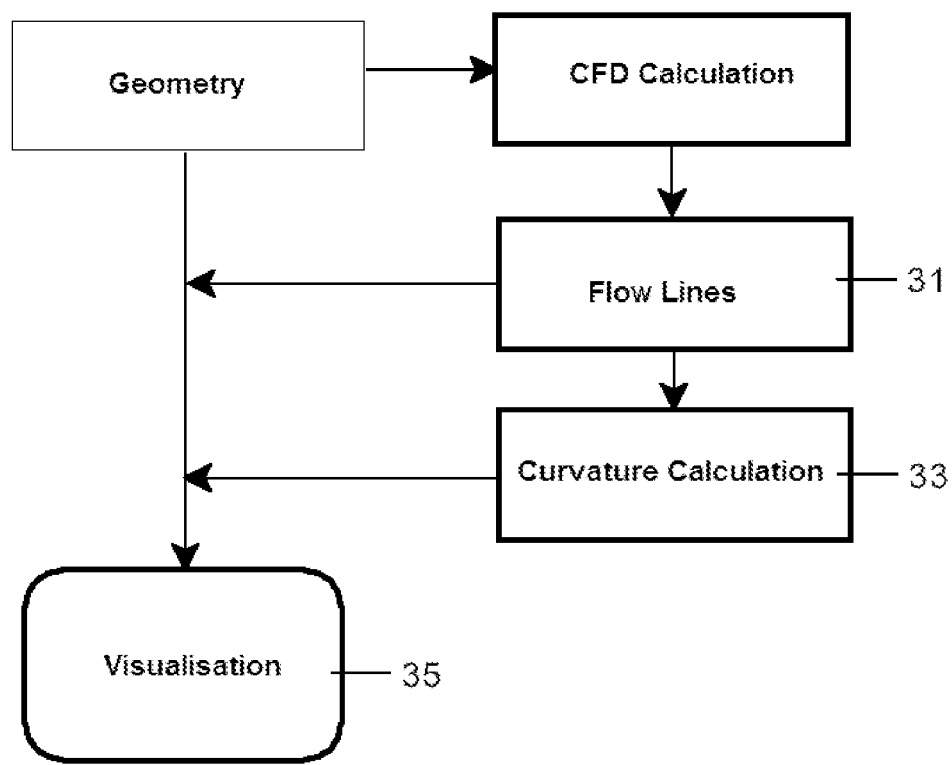
FIG. 2 shows a block diagram illustrating a method according to one embodiment of the present invention.

Thus, according to the present invention, in the design process of an aerodynamic surface using CFD, steps are included in order to represent and view the curvature and, additionally other relevant variables, according to the direction of the flow lines. This assumes, as illustrated in FIG. 2 a step 31 in which within the CFD calculation flow lines are obtained corresponding to the characteristics of the flow considered, a step 33 in which the curvature is calculated and, if appropriate, other additional variables according to the flow lines and a step 35 in which the geometry of the surface and the values of the curvature are visualized, and if appropriate, other additional variables according to the flow lines.

The incorporation of the steps of the method in this invention to a design process of an aerodynamic surface using CFD may be made in the post process state thereof and requires:

the incorporation of a specific software for calculation of the curvature, and, if appropriate, other additional variables;

the incorporation of a specific software or the adaptation of software for viewing the geometry available, in order to view on the surface in question the curvature values and, if appropriate, other variables according to the flow lines.

In order to facilitate comprehension of the methods and systems of this invention, an example of the application of said methods and systems with reference to FIGS. 3-8 is described below.

The body 41 comprises a straight cylinder 43 0.4 m long and with a radius of 0.1 m, closed in front and behind by respective rotation semi-ellipsoids 45, 47 0.4 m long and with rotating semi-axis 0.1 m in length.

The body moves in a flow field in specific conditions which specifically include a 0.75 Mach number and an 8° attack angle.

As a result of the aforementioned step 31, the CFD calculation provides the friction vector in each point of the surface of the body 41 which in step 35 will be viewed through the flow lines 51.

On the basis of said friction vector and the geometry of the body 41 in previously mentioned step 33, by means of a specific code in C language, the normal curvature at each point of the body surface 41 is calculated.

Figure 3:
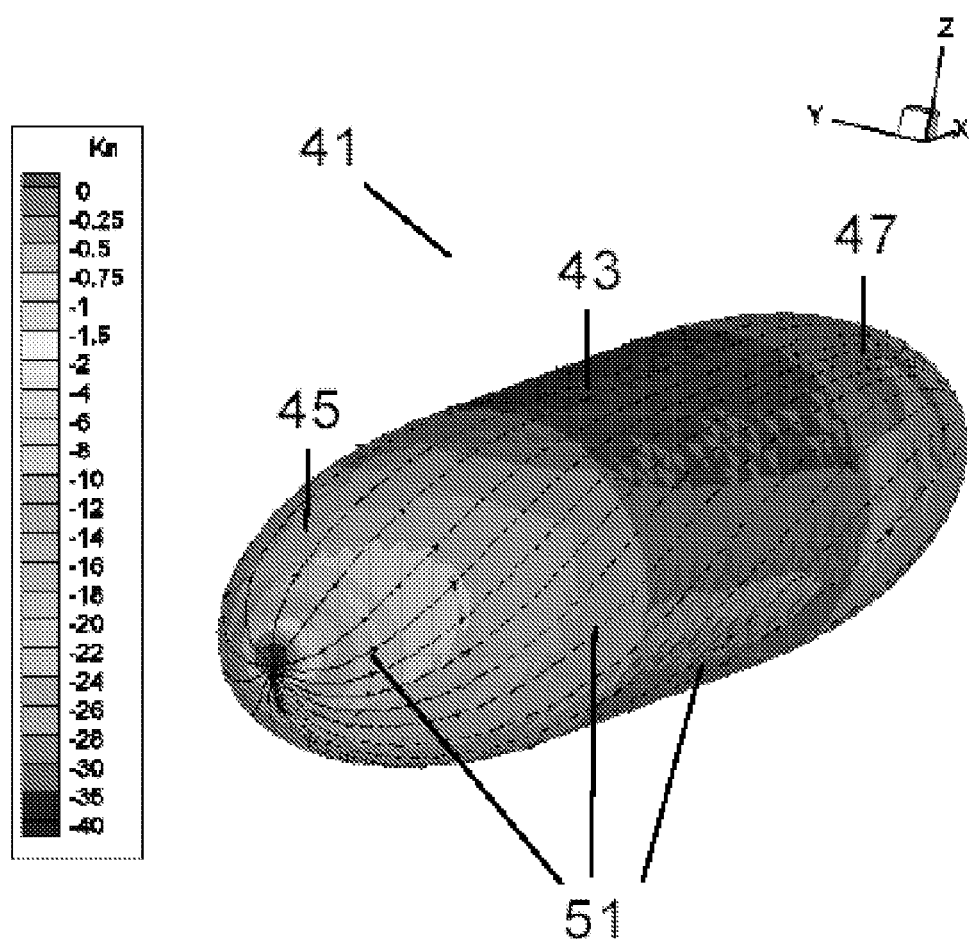
FIGS. 3 and 4 show an example of an embodiment of the invention in which the representation of the values of the normal curvature in the direction of friction lines is carried out on the actual surface of the body considered, seen from the front and back respectively.
Figure 4:
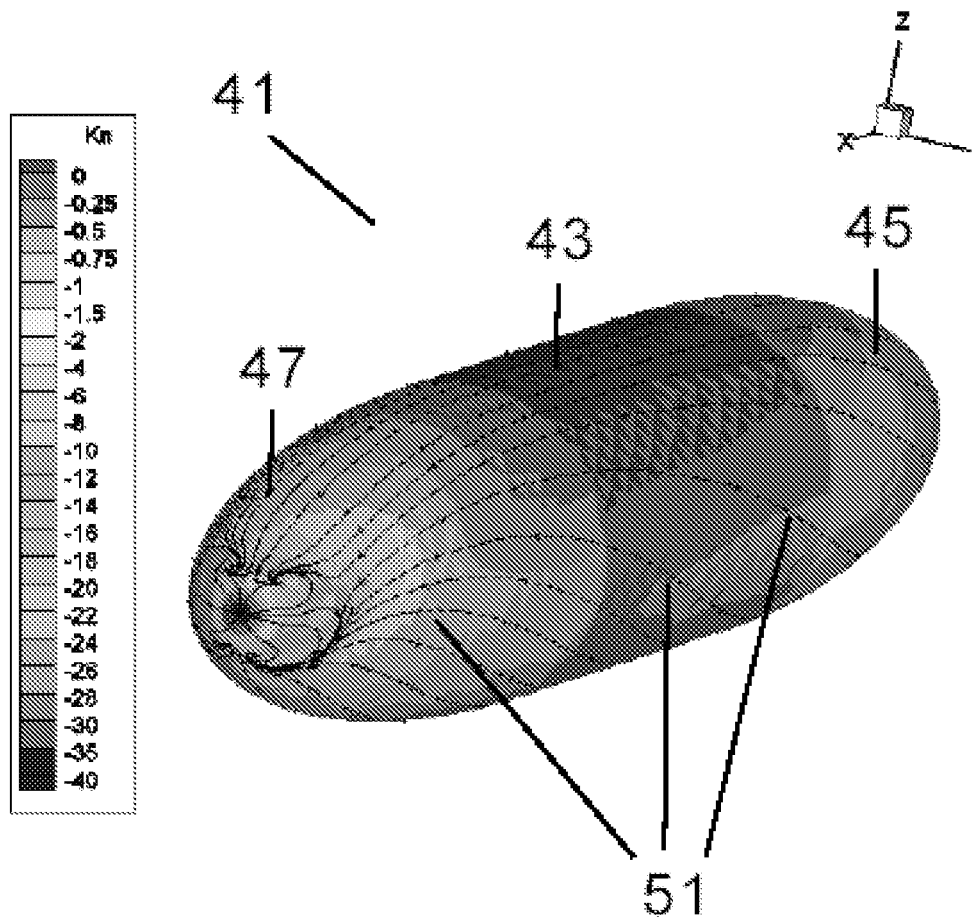

In one embodiment of the invention illustrated in FIGS. 3 and 4, the curvature values are represented on the actual surface of the body 41 by means of a pre-established color code.

Figure 5:
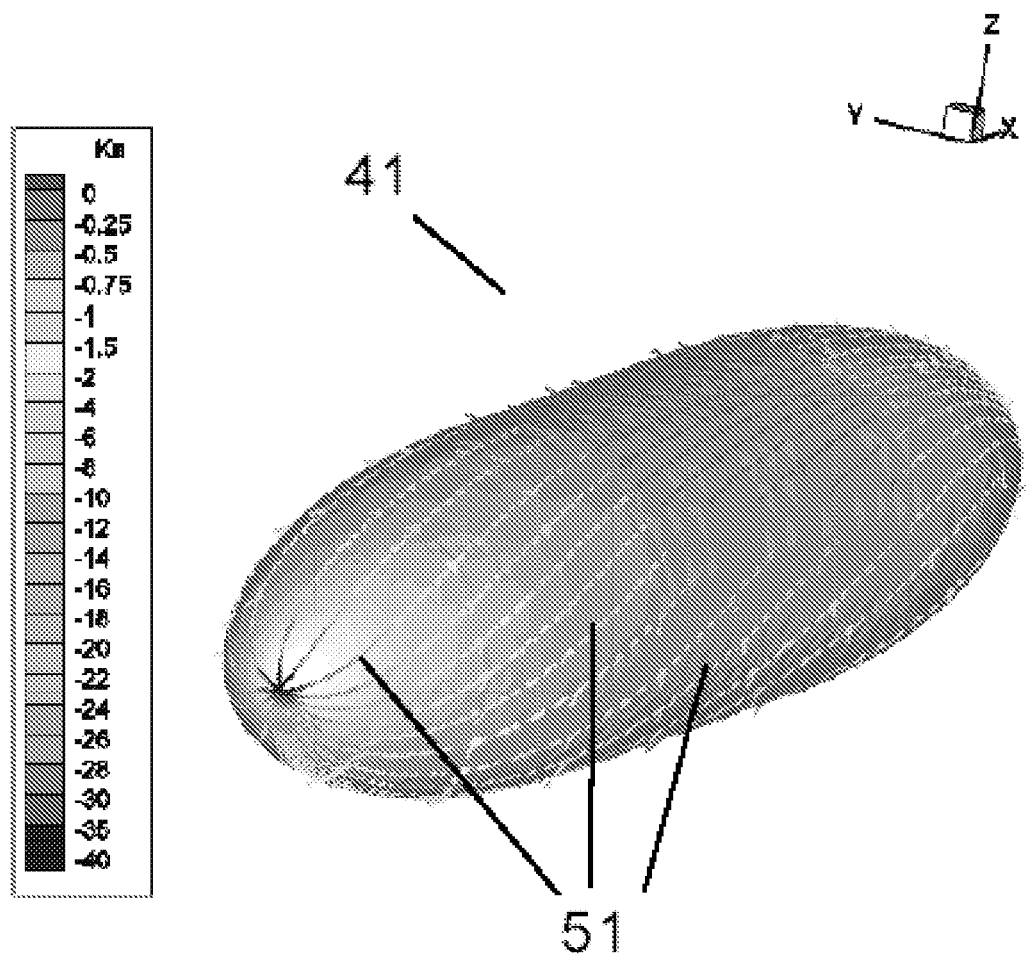
FIGS. 5 and 6 show an example of an embodiment of the invention in which the representation of the values of the normal curvature in the direction of the friction lines in the surface of the body in question, seen from the front and back respectively, are carried out on the friction lines.
Figure 6:
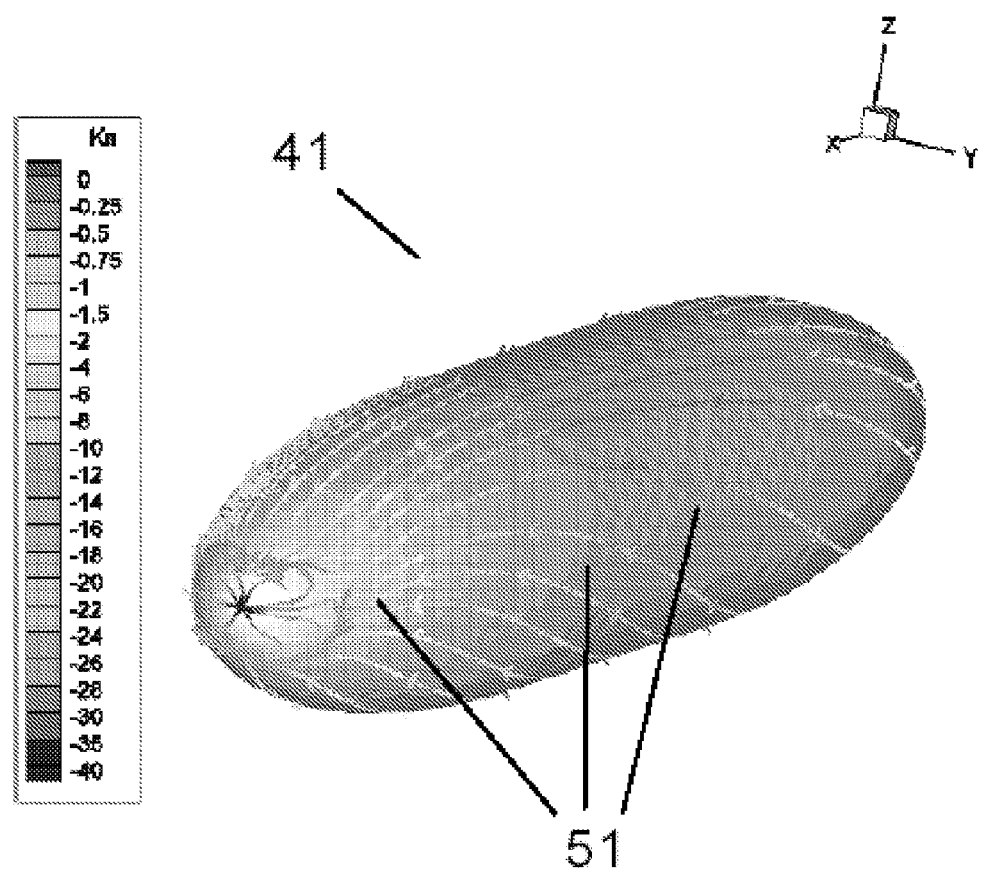

In one embodiment of the invention illustrated in FIGS. 5 and 6, the curvature values are represented on flow lines 51 by means of a pre-established color code.

Figure 7:
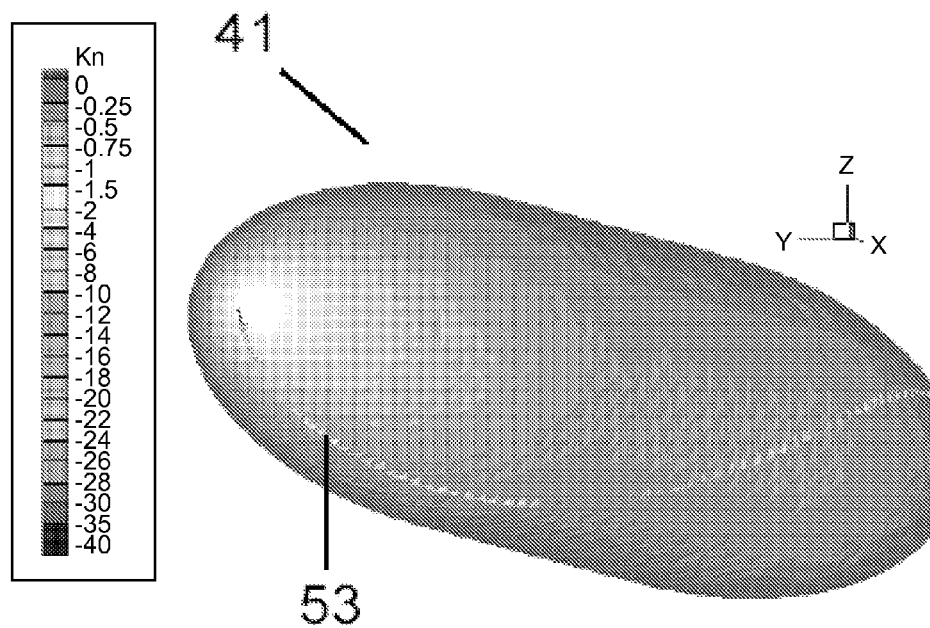
FIGS. 7 and 8 show an example of an embodiment of the invention in which an additional graph is included of the evolution of normal curvature with the coordinate X for a specific flow line.
Figure 7:
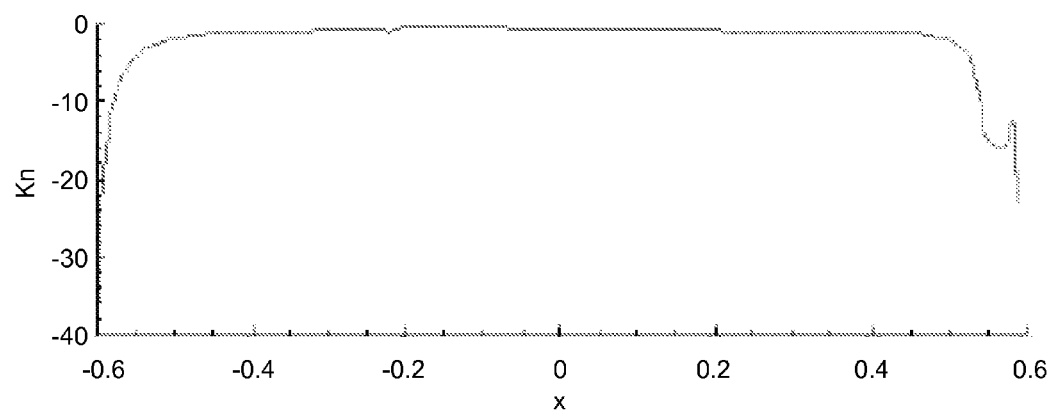
Figure 8:
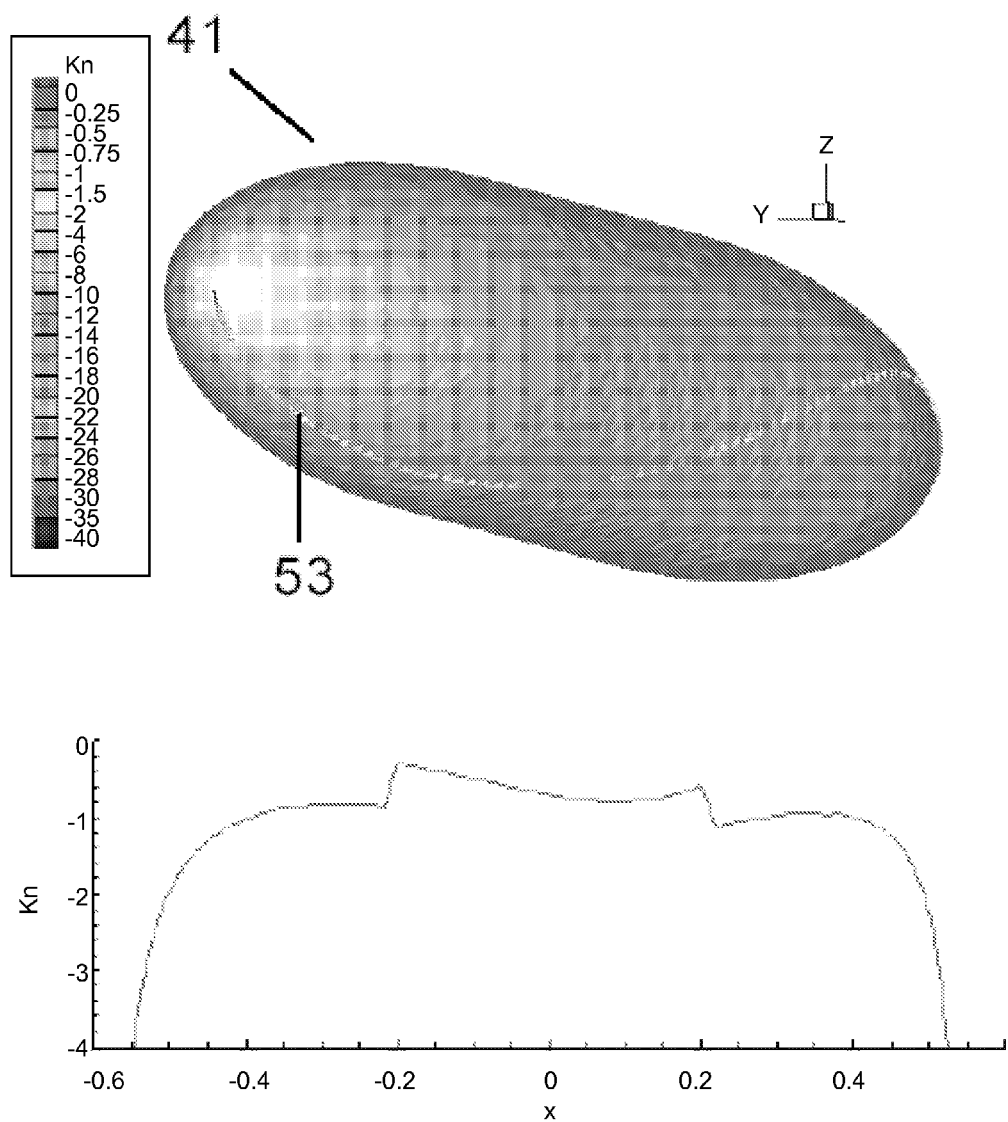

Furthermore, the values of the curvature may be represented along a specific flow line as shown in FIGS. 7 and 8 in which the evolution of the normal curvature is represented with the coordinate X for the flow line 53 (formally, the maximum information would be obtained by using the actual parameter arc of the flow line considered as a viewing coordinate, however, the example used is sufficient for our purposes, being less complex). In FIG. 8 in the zone of the curvature leap between cylinder 43 and semi-ellipsoids 45, 47 the ordinates have been amplified so that they can be better appreciated.

It should be noted that the normal maximum curvature of the cylinder takes the value 1/R that is, $10\,\mathrm{m}^{(-1)}$ which is that observed by the parallels, whereas the minimum is 0, which is that appearing in the meridians (which generate the cylinder). In the case of ellipsoids, and particularizing the calculation to the circumference limiting the cylinder with them, the normal maximum curvature is $10\,\mathrm{m}^{(-1)}$ and the minimum is $0.625\,\mathrm{m}^{(-1)}$ (using the formula $R/(a*a)$, with "a" being the semi-axis which is not that of rotation, which differs from zero and occurs in the meridians, obviously. In the figures the curvature values have less sign because the normal value of the surface "outwards" from the body has been chosen.

The overall visualization of the geometry of the surface and of the curvature values according to the flow lines is of considerable assistance to the designer in optimizing aerodynamic surfaces as it permits easy identification of those zones appropriate for optimization. In this respect, observing the previous figures, the existence of a leap in the normal curvature is noted between the semi-ellipsoids 45, 47 and the cylinder 43, with the friction line being greater the more parallel it is to the rotation axis (axis x Cartesian coordinates). The curvature jump between the cylinder and the semi-ellipsoids is notable, being less the more oblique the friction line is, that is, the less parallel it is to the rotation axis. The leading edges and outlet present the greatest curvature. FIGS. 4 and 6 show clearly the zone of detachment and recirculation typical of a blunt body at its posterior end.

In the case of aircraft surfaces, the methods and systems of this invention are especially useful for optimizing the design of those surfaces with complex geometries such as, for example, that of the zone housing the landing gear. The information obtained may be used directly by the designer in order to identify critical zones in the surface, which could contribute to detaching the flow or to unnecessary increases in aerodynamic resistance.

In the previous explanation variables have been mentioned, in addition to the curvature, which could be the object of calculation and graphic representation in a similar manner to that of the curvature and among those considered, the following are particularly relevant:

Pressure gradient according to the direction of the local flow.

Curvature conditioned on the existence of an adverse pressure gradient according to the direction of the local flow.

It is possible to introduce in the preferred embodiment that we have described, those modifications which are included in the scope of the following claims.

The invention claimed is:

1. A computer assisted method for optimizing a design of a surface of a body which moves through a flow field, the method comprising:
    preparation of a computational fluid dynamics (CFD) simulation of said body that involves at least one CFD calculation;
    resolution of the CFD calculation for at least one specified condition of the flow field and obtaining at least one flow line of a flow on said surface of the body;
    calculation of a normal curvature of the surface according to a direction of the at least one flow line; and
    simultaneous visualization of the surface of said body and of said normal curvature.

2. The method according to any of claim 1 further comprising calculation of at least one aerodynamic flow variable according to the direction of said at least one flow line; and
    simultaneous visualization of said at least one aerodynamic flow variable according to the direction of said at least one flow line.

3. The method according to claim 2, wherein said at least one aerodynamic flow variable is a pressure gradient.

4. The method according to claim 2 wherein said normal curvature and said at least one aerodynamic flow variable are visualized graphically on the surface of the body.

5. The method according to claim 2 wherein said normal curvature and said at least one aerodynamic flow variable are graphically visualized on the at least one flow line.

6. The method according to claim 1 wherein a fluid, through which the surface of the body flows, is a viscous fluid, and the at least one flow line considered includes at least one local friction line and/or a projection on the surface of the at least one flow line external to a limit layer.

7. The method according to claim 1, wherein a fluid, through which the surface of the body flows, is a non-viscous fluid and at least one flow line considered is a local flow line of the flow on the surface.

8. The method according to claim 1 wherein said surface is a surface belonging to an aircraft.

9. A computer implemented system for optimizing a design of a surface of a body which moves through a flow field, the computer implemented system comprising:
    a CAD module for visualizing said surface and a geometric or a physical characteristic associated therewith;
    a computational fluid dynamics (CFD) module in 3D implemented in the computer in order to obtain at least one flow line on said surface for at least one specified condition of the flow field;
    and a calculation module, the calculation module configured to: receive from the CFD module at least one geometric characteristic of at least one flow line;
    calculate a normal curvature of the surface according to a direction of said at least one flow lines; and
    transmit the calculations of said normal curvature to the CAD module for visualization of said normal curvature.

10. The computer implemented system according to claim 9 wherein said calculation module is further configured to calculate at least one aerodynamic fluid variable according to the direction of said at least one flow line and transmit the results to the CAD module for visualization.

11. The computer implemented system according to claim 10, wherein said at least one aerodynamic fluid variable is a pressure gradient.

12. The computer implemented system according to claim 9 wherein the surface is a surface belonging to an aircraft.

* * * * *

UNITED STATES PATENT AND TRADEMARK OFFICE
CERTIFICATE OF CORRECTION

PATENT NO.        : 8,504,340 B2                               Page 1 of 1
APPLICATION NO.   : 12/956831
DATED             : August 6, 2013
INVENTOR(S)       : Daniel Redondo Garcia et al.

It is certified that error appears in the above-identified patent and that said Letters Patent is hereby corrected as shown below:

In the Claims

Column 6, Lines 19-20, Claim 2:
"2. The method according to any of claim 1 further comprising
calculation of at least one aerodynamic flow variable" should read,
--2. The method according to claim 1, further comprising:
calculation of at least one aerodynamic flow variable--.

Column 6, Lines 39-40, Claim 7:
"through which the surface of the body flows, is a non-viscous fluid and at least one flow line
considered is a local flow line" should read, --through which the surface of the body flows, is a non
viscous fluid and the at least one flow line considered is a local flow line--.

Column 6, Lines 52-53, Claim 9:
"condition of the flow field;
and a calculation module, the calculation module" should read,
--condition of the flow field; and
a calculation module, the calculation module--.

Column 6, Line 55, Claim 9:
"characteristic of at least one flow line;" should read, --characteristic of said at least one flow line;--.

Signed and Sealed this
Thirteenth Day of May, 2014

Michelle K. Lee
*Deputy Director of the United States Patent and Trademark Office*